United States Patent [19]

Murashima et al.

[11] Patent Number: 5,350,193

[45] Date of Patent: Sep. 27, 1994

[54] AIR BAG INFLATION GAS GENERATOR

[75] Inventors: Mitsuaki Murashima; Sakae Takahashi; Yukio Ikeda; Hirokazu Kobari; Michio Shiota; Takashi Kazumi, all of Fukushima, Japan

[73] Assignee: Nippon Koki Co., Ltd., Tokyo, Japan

[21] Appl. No.: 127,758

[22] Filed: Sep. 27, 1993

[30] Foreign Application Priority Data

Jun. 22, 1993 [JP] Japan .................. 5-150386
Jun. 22, 1993 [JP] Japan .................. 5-150387
Jun. 22, 1993 [JP] Japan .................. 5-150388
Jun. 22, 1993 [JP] Japan .................. 5-150389

[51] Int. Cl.5 .............................................. B60R 21/26
[52] U.S. Cl. ................................... 280/741; 280/736
[58] Field of Search ............... 280/736, 737, 738, 739, 280/740, 741

[56] References Cited

U.S. PATENT DOCUMENTS

| 4,370,930 | 2/1983 | Strasser et al. | 280/741 |
| 4,734,265 | 3/1988 | Nilsson et al. | 280/741 |
| 4,944,528 | 7/1990 | Nilsson et al. | 280/741 |
| 4,998,751 | 3/1991 | Paxton et al. | 280/741 |
| 5,219,178 | 6/1993 | Kobari et al. | 280/741 |

Primary Examiner—Kenneth R. Rice
Attorney, Agent, or Firm—Kalish & Gilster

[57] ABSTRACT

This invention relates to an air bag inflation gas generator to feed combustion gas for inflation of air bags such as air bags for absorbing collision shocks, life jackets, rafts, and escape chutes. When the generator is exposed to a high temperature environment such as fire and a temperature of a second end plate rises, heat of the second end plate is transmitted to an ignition agent via a heat sensing means, the ignition agent is ignited at a temperature thoroughly lower than the firing temperature of gas generating agents, and the gas generating agents burn.

5 Claims, 21 Drawing Sheets

AIR BAG INFLATION GAS GENERATOR

BACKGROUND OF THE INVENTION

1. FIELD OF THE INVENTION

This invention relates to an air bag inflation gas generator to feed combustion gas for inflation of air bags such as air bags for absorbing collision shocks, life jackets, rafts, and escape chutes.

2. DESCRIPTION OF THE PRIOR ARTS

A prior shock absorber to protect a passenger car driver from shocks at collision accidents comprises an air bag and a gas generator to inflate the air bag with gas. At a collision accident of a passenger car, explosives or other gas generating agents having a similar composition thereto, which are charged in the gas generator, are ignited and burnt to produce gas. The air bag is instantaneously inflated by the resultant gas for protecting the driver against any collision shocks, thereby avoiding possible serious injury of the driver.

FIG. 28 shows the air bag inflation gas generator filed by the applicant as Japanese Patent Application No. 299116/1991. This air bag inflation gas generator comprises a longitudinal outer cylindrical member 13 having a plurality of gas outlets 11 formed in the outer periphery, an inner cylindrical member 17 inserted in the outer cylindrical member 13 and having gas flow openings 15 formed in the outer periphery, a final filter 19 disposed between the outer cylindrical member 13 and the inner cylindrical member 17, a plurality of gas generating agents 23 with a through hole 21 formed at the center accommodated in the stacked state in the axial direction of the inner cylindrical member 17, and an igniter 25 and an ignition agent 27 disposed at one end of the inner cylindrical member 17, wherein the gas generating agents 23 and the ignition agent 27 are accommodated in a gas generating agent pack 29.

With the above air bag inflation gas generator, volume of combustion gas from the gas generating agents 23 can be steeply increased and a large volume of combustion gas can be surely purified.

But, in the above air bag inflation gas generator, when the generator is exposed to a high temperature atmosphere, for example, about 390C.°, the gas generating agents 23 in the generator reach a firing point and ignite themselves. At this time, a reaction velocity is very fast and the strength of a vessel accommodating the gas generating agents 23 is lowered at such a high temperature, so that there is a possibility that the vessel is exploded.

And, since the above air bag inflation gas generator has the gas generating agent pack 29 merely accommodated within the inner cylindrical member 17, a space between the ignition agent 27 and the igniter 25 in the gas generating agent pack 29 may not be securely retained and, in particular, when the space between the ignition agent 27 and the igniter 25 is widened, igniting performance is possibly degraded.

SUMMARY OF THE INVENTION

This invention has remedied the above problems and aims to provide an air bag inflation gas generator which can extensively lower the possibility that a vessel is exploded under a high temperature environment as compared with prior art and can securely retain a space between an ignition agent and an igniter in a gas generating agent pack.

The air bag inflation gas generator according to the first embodiment of this invention comprises a longitudinal cylindrical member whose both ends are sealed by a first end plate and a second end plate and whose outer periphery has a plurality of gas outlets formed, a gas generating agent pack which is accommodated in the above cylindrical member, which has a plurality of gas generating agents accommodated in the stacked state in the axial direction within a longitudinal cylindrical pack with both ends sealed by a first end face and a second end face, and which has an ignition agent disposed near the above first end face, an igniter which is disposed at the first end plate of the above cylindrical member, and an energizing member which is disposed between the second end plate of the above cylindrical member and the second end face of the above cylindrical pack and energizes the cylindrical pack toward the above igniter. And, the first end plate is caulked for fixing by an open end of the above cylindrical member toward the above cylindrical pack, a projection accommodating the ignition agent is formed on the second end face of the above cylindrical pack with a certain gap disposed with respect to the above second end plate, and a heat transmission member which is pressed against the above second end plate by the above energizing member is fitted to the projection under a fitting load smaller than the energizing force of the energizing member.

The air bag inflation gas generator according to the second embodiment of this invention comprises a longitudinal cylindrical member whose both ends are sealed by a first end plate and a second end plate and whose outer periphery has a plurality of gas outlets formed, a gas generating agent pack which is accommodated in the above cylindrical member, which has a plurality of gas generating agents accommodated in the stacked state in the axial direction within a longitudinal cylindrical pack with both ends seal ed by a first end face and a second end face, and which has an ignition agent disposed near the above first end face, an igniter which is disposed at the first end plate of the above cylindrical member, and an energizing member which is disposed between the second end plate of the above cylindrical member and the second end face of the above cylindrical pack and energizes the cylindrical pack toward the above igniter. And, the first end plate is caulked for fixing by an open end of the above cylindrical member toward the above cylindrical pack, a projection accommodating the ignition agent is formed on the second end face of the above cylindrical pack, and the projection is inserted into a concave part which is formed in the above second end plate under a fitting load smaller than the energizing force of the energizing member with a certain gap disposed with respect to the bottom of the concave part.

In the air bag inflation gas generator according to the first embodiment of the invention, when the generator is exposed to a high temperature environment such as fire and a temperature of the second end plate rises, heat of the second end plate is transmitted to the ignition agent accommodated in the projection via the heat transmission member which is fitted to the projection of the cylindrical pack, the ignition agent is ignited at a temperature thoroughly lower than the firing temperature of the gas generating agents, then the gas generating agents are burnt.

And, in the above air bag inflation gas generator, when the first end plate is caulked by the open end of the cylindrical member toward the cylindrical pack, the cylindrical pack is shifted toward the second end plate but, since the projection is formed with a certain gap disposed with respect to the second end plate and is inserted in the heat transmission member under a fitting load smaller than the energizing force of the energizing member, the projection is relatively easily moved forward, so that the application of a heavy load to the projection can be prevented.

On the other hand, when the caulking process completes, since the projection is inserted in the heat transmission member under a fitting load smaller than the energizing force of the energizing member, the cylindrical pack is moved toward the first end plate by the energizing force of the energizing member, so that the first end face of the cylindrical pack can be surely contacted to the first end plate.

In the air bag inflation gas generator according to the second embodiment of the invention, when the generator is exposed to a high temperature environment such as fire and a temperature of the second end plate rises, heat of the second end plate is transmitted to the ignition agent accommodated in the projection of the cylindrical pack inserted in the concave part, the ignition agent is ignited at a temperature thoroughly lower than the firing temperature of the gas generating agents, then the gas generating agents are burnt.

And, in the above air bag inflation gas generator, when the first end plate is caulked by the open end of the cylindrical member toward the cylindrical pack, the cylindrical pack is shifted toward the second end plate but, since the projection is inserted in the concave part formed in the second end plate under a fitting load smaller than the energizing force of the energizing member with a certain gap disposed with respect to the bottom of the concave part, the projection is relatively easily moved forward, so that the application of a heavy load to the projection can be prevented.

On the other hand, when the caulking process completes, since the projection is inserted in the concave part formed in the second end plate under a fitting load smaller than the energizing force of the energizing member, the cylindrical pack is moved toward the first end plate by the energizing force of the energizing member, so that the first end face of the cylindrical pack can be surely contacted to the first end plate.

In the air bag inflation gas generator according to the first and second embodiments of the invention, when the generator is exposed to a high temperature environment such as fire and a temperature of the second end plate rises, heat of the second end plate is transmitted to the ignition agent accommodated in the projection via the heat transmission member fitted to the projection of the cylindrical pack or directly from the concave part, the ignition agent is ignited at a temperature thoroughly lower than the firing temperature of the gas generating agents, then the gas generating agents are burnt, so that the possibility of inducing the explosion of the vessel under a high temperature environment can be remarkably lowered as compared with prior art.

And, in the air bag inflation gas generator according to the first and second embodiments of the invention, since the energizing member presses the first end face of the cylindrical pack against the first end plate in which the igniter is accommodated, a space between the ignition agent and the igniter disposed at one end of the cylindrical pack can be surely retained.

Further, in the air bag inflation gas generator according to the first and second embodiments of the invention, the heat transmission member is fitted to the projection under a fitting load smaller than the energizing force of the energizing member or the projection is fitted to the concave part formed in the second end plate under a fitting load smaller than the energizing force of the energizing member. Therefore, even if the cylindrical pack is shifted toward the second end plate when the first end plate is caulked by the open end of the cylindrical member toward the cylindrical pack, the caulking process can be surely conducted since the first end face of the cylindrical pack is pressed to move toward the first end plate in which the igniter is accommodated at the termination of the caulking process.

The air bag inflation gas generator according to the third embodiment of the invention comprises a longitudinal cylindrical member whose both ends are sealed by a first end plate and a second end plate and whose outer periphery has a plurality of gas outlets formed, a gas generating agent pack which is accommodated in the above cylindrical member, which has a plurality of gas generating agents accommodated in the stacked state in the axial direction within a longitudinal cylindrical pack with both ends sealed by a first end face and a second end face, and which has an ignition agent disposed near the above first end face, and an igniter which is disposed at the first end plate of the above cylindrical member. And, the above first end plate is caulked for fixing toward the above cylindrical pack by the open end of the above cylindrical member, a projection accommodating an ignition agent is formed on the second end face of the above cylindrical pack, and between the leading end face of the projection and the above second end plate, a heat transmission member made of metal with good heat conductivity and having a function to energize the above cylindrical pack toward the first end plate is disposed.

In the air bag inflation gas generator according to the third embodiment of the invention, when the generator is exposed to a high temperature environment such as fire and a temperature of the second end plate rises, heat of the second end plate is transmitted to the ignition agent accommodated within the projection via the heat transmission member disposed between the projection of the cylindrical pack and the second end plate, the ignition agent is ignited at a temperature thoroughly lower than the firing temperature of the gas generating agent, and the gas generating agents are burnt.

And, in the air bag inflation gas generator according to the third embodiment of the invention, when the first end plate is caulked toward the cylindrical pack by the open end of the cylindrical member, the cylindrical pack is moved toward the second end plate and, at this time, the heat transmission member is deformed toward the second end plate, so that the application of a heady load to the projection can be prevented.

On the other hand, in the air bag inflation gas generator according to the third embodiment of the invention, when the caulking process completes, the cylindrical pack is moved toward the first end plate by the energizing force of the heat transmission member, so that the first end face of the cylindrical pack can be surely contacted to the first end plate.

In the air bag inflation gas generator according to the third embodiment of the invention, when the generator is exposed to a high temperature environment such as fire and a temperature of the second end plate rises, heat of the second end plate is transmitted to the ignition agent accommodated in the projection via the heat transmission member disposed between the leading end face of the projection of the cylindrical pack and the second end plate, the ignition agent is ignited at a temperature thoroughly lower than the firing temperature of the gas generating agents, then the gas generating agents are burnt, so that the possibility of inducing the explosion of the vessel under a high temperature environment can be remarkably lowered as compared with prior art.

And, in the air bag inflation gas generator according to the third embodiment of the invention, the first end face of the cylindrical pack is pressed by the heat transmission member against the first end plate in which the igniter is accommodated, so that a space between the ignition agent and the igniter disposed at one end of the cylindrical pack can be surely retained.

In the air bag inflation gas generator according to the third embodiment of the invention, even if the cylindrical pack is shifted toward the second end plate when the first end plate is caulked by the open end of the cylindrical member toward the cylindrical pack, the caulking process can be surely conducted since the first end face of the cylindrical pack is pressed to move toward the first end plate in which the igniter is accommodated at the termination of the caulking process.

The air bag inflation gas generator according to the fourth embodiment of the invention comprises a longitudinal cylindrical member whose both ends are sealed by a first end plate and a second end plate and whose outer periphery has a plurality of gas outlets formed, a gas generating agent pack which is accommodated in the above cylindrical member, which has a plurality of gas generating agents accommodated in the stacked state in the axial direction within a longitudinal cylindrical pack with both ends sealed by a first end face and a second end face, and which has an ignition agent disposed near the above first end face, an igniter which is disposed at the first end plate of the above cylindrical member, and an energizing member which is disposed between the second end plate of the above cylindrical member and the second end face of the above cylindrical pack and energizes the cylindrical pack toward the above igniter. And, the first end plate is caulked for fixing by an open end of the above cylindrical member toward the above cylindrical pack, a projection accommodating the ignition agent is formed on the second end face of the above cylindrical pack with a certain gap disposed with respect to the above second end plate, and a temperature sensing member is disposed within the above second end plate to contact under a certain pressure to the above projection and the second end plate by deforming at a certain temperature and to transmit heat from the above second end plate to the projection.

In the air bag inflation gas generator according to the fourth embodiment of the invention, when the generator is exposed to a high temperature environment such as fire and a temperature of the second end plate rises, a temperature of the temperature sensing member rises, the temperature sensing member is deformed to contact to the projection and the second end plate under a certain pressure, heat of the second end plate is transmitted to the ignition agent accommodated in the projection via the temperature sensing member, the ignition agent is ignited at a temperature thoroughly lower than the firing temperature of the gas generating agents, then the gas generating agents are burnt.

And, in the air bag inflation gas generator according to the fourth embodiment of the invention, even if the cylindrical pack is shifted toward the second end plate when the first end plate is caulked by the open end of the cylindrical member toward the cylindrical pack, the projection moves relatively easily because the temperature sensing member is not pressed against the projection, so that the application of a heavy load to the projection can be prevented.

On the other hand, in the air bag inflation gas generator according to the fourth embodiment of the invention, since the temperature sensing member is not pressed against the projection at the termination of caulking process, the cylindrical pack is moved toward the first end plate by the energizing force of the energizing member and the first end face of the cylindrical pack can be surely contacted to the first end plate.

In the air bag inflation gas generator according to the fourth embodiment of the invention, when the generator is exposed to a high temperature environment such as fire and a temperature of the second end plate rises, a temperature of the temperature sensing member rises, the temperature sensing member is deformed to contact to the projection and the second end plate under a certain pressure, heat is transmitted to the ignition agent accommodated in the projection via the temperature sensing member, the ignition agent is ignited at a temperature thoroughly lower than the firing temperature of the gas generating agents, then the gas generating agents are burnt, so that the possibility of inducing the explosion of the vessel under a high temperature environment can be remarkably lowered as compared with prior art.

And, in the air bag inflation gas generator according to the fourth embodiment of the invention, the first end face of the cylindrical pack is pressed by the energizing member against the first end plate in which the igniter is accommodated, so that a space between the ignition agent and the igniter disposed at one end of the cylindrical pack can be surely retained.

Further, in the air bag inflation gas generator according to the fourth embodiment of the invention, even if the cylindrical pack is shifted toward the second end plate when the first end plate is caulked by the open end of the outer cylindrical member toward the cylindrical pack, the projection moves relatively easily forward because the temperature sensing member is not pressed against the projection, so that the application of a heavy load to the projection can be prevented.

The air bag inflation gas generator according to the fifth embodiment of the invention comprises a longitudinal cylindrical member whose both ends are sealed by a first end plate and a second end plate and whose outer periphery has a plurality of gas outlets formed, a gas generating agent pack which is accommodated in the above cylindrical member, which has a plurality of gas generating agents accommodated in the stacked state in the axial direction within a longitudinal cylindrical pack with both ends sealed by a first end face and a second end face, and which has an ignition agent disposed near the above first end face, and an igniter which is disposed at the first end plate of the above cylindrical member. And, the ignition agent is disposed on the second end face of the above cylindrical pack, and an auto-ignition igniting at a firing temperature which is lower than the firing temperature of the gas generating agents and higher than the maximum temperature which generally occurs is disposed in a concave part formed in the second end plate of the above cylindrical member.

In the air bag inflation gas generator according to the fifth embodiment of the invention, when the generator is exposed to a high temperature environment such as fire and a temperature of the second end plate exceeds the maximum temperature which generally occurs, the auto-ignition is ignited, the ignition agent is ignited at a temperature thoroughly lower than the firing temperature of the gas generating agents, then the gas generating agents are burnt.

In the air bag inflation gas generator according to the fifth embodiment of the invention, when the generator is exposed to a high temperature environment such as fire and a temperature of the second end plate exceeds the maximum temperature which generally occurs, the auto-ignition is ignited, the ignition agent is ignited at a temperature thoroughly lower than the firing temperature of the gas generating agents, then the gas generating agents are burnt, so that the possibility of inducing the explosion of the vessel under a high temperature environment can be remarkably lowered as compared with prior art.

DESCRIPTION OF THE PREFERRED EMBODIMENT OF THE INVENTION

This invention will be described in detail with reference to the attached drawings.

Figure 1:
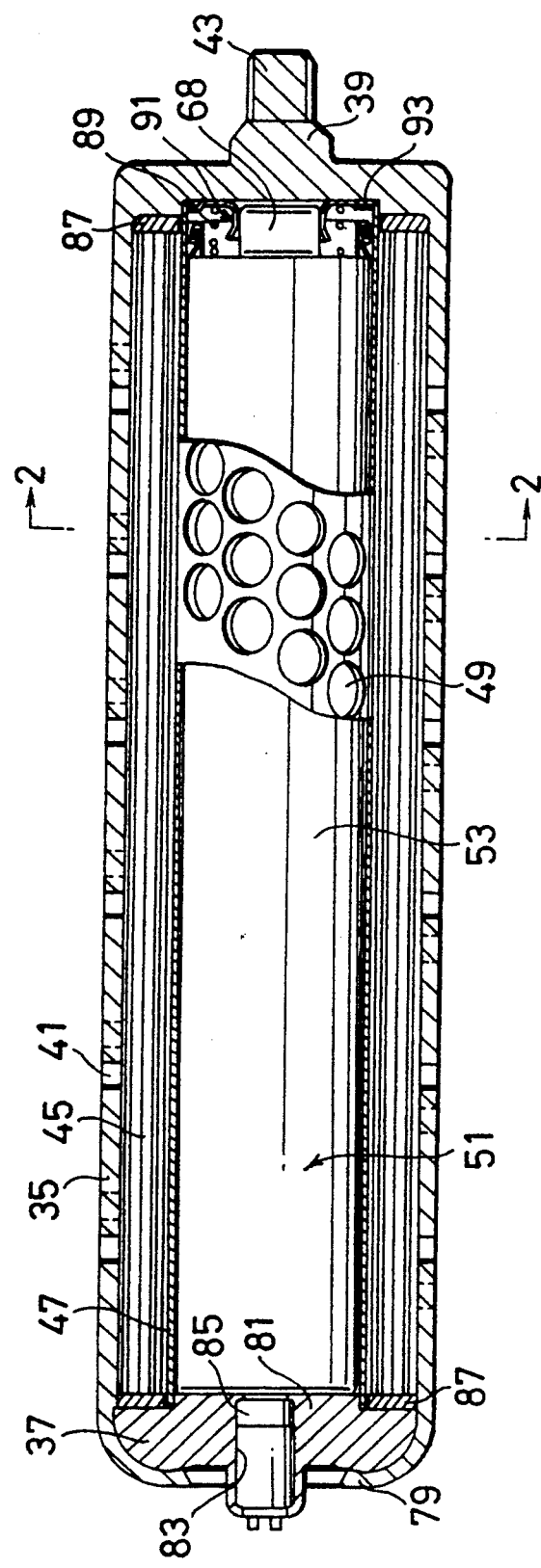
FIG. 1 is a longitudinal sectional view showing one example of an air bag inflation gas generator according to the first embodiment of this invention.
Figure 2:
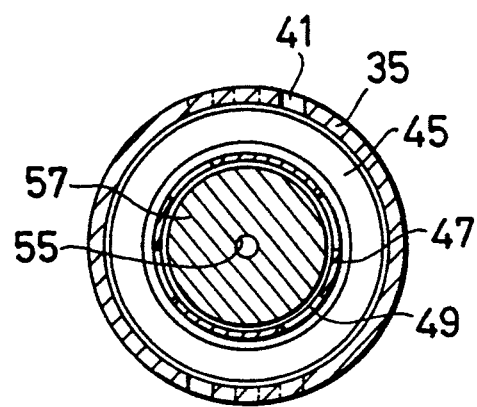
FIG. 2 is a transverse sectional view taken along the line 2—2 of FIG. 1.

FIG. 1 and FIG. 2 show one example of the air bag inflation gas generator according to the first embodiment of this invention. In the drawings, the reference numeral 35 represents a longitudinal outer cylindrical member whose both ends are tightly closed by a first end plate 37 and a second end plate 39.

The outer cylindrical member 35 has a plurality of gas flow openings 41 formed in its outer periphery.

And, the end plate part 39 is integrally formed with a part 43 to be mounted on a vehicle.

The outer cylindrical member 35 has a cylindrical final filter 45 disposed therein.

This final filter 45 is formed by winding, for example, fine-mesh woven metal wire, close-woven metal wire, etc. in layers. This filter has the functions that the combustion gas is cooled so that the air bag is not damaged, the combustion residue contained in the combustion gas is removed, and harmless nitrogen gas only is supplied into the air bag.

Inside the final filter 45 is inserted an inner cylindrical member 47.

The inner cylindrical member 47 has many gas flow openings 49 formed in the entire length of the outer periphery thereof.

The inner cylindrical member 47 accommodates a gas generating agent pack 51.

Figure 3:
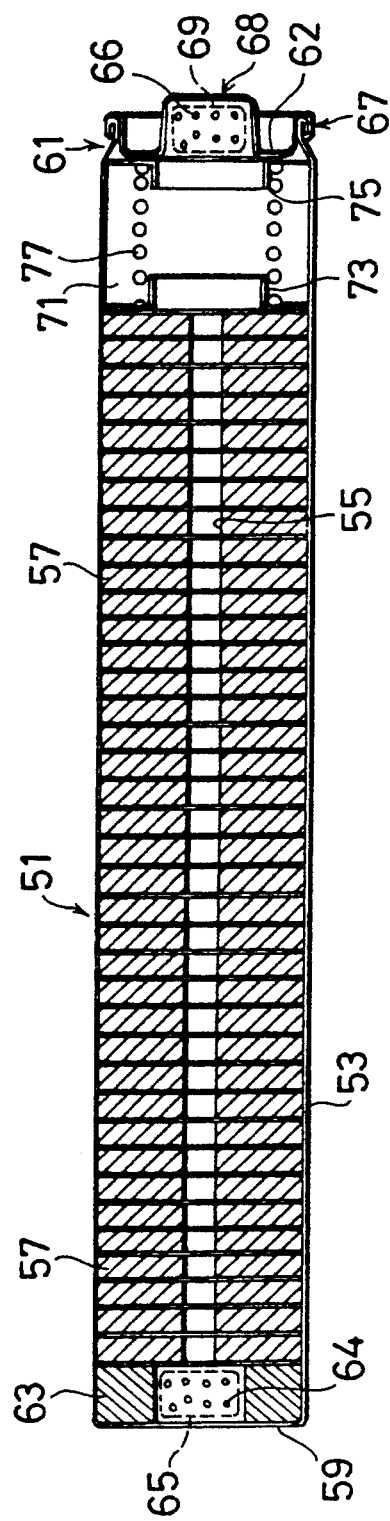
FIG. 3 is a sectional view showing the gas generating agent pack of FIG. 1.

The gas generating agent pack 51 has a bottom-closed longitudinal cylindrical pack 53 which is made of aluminum as shown in FIG. 3.

Within the cylindrical pack 53, many gas generating agents 57 having a through hole 55 formed in their center are accommodated in the stacked state in the axial direction.

One end of the cylindrical pack 53 is sealed by a first end face 59, and the other end is sealed by a second end face 62 made of, for example, an aluminum cap 61.

At one end of the cylindrical pack 53, a cylindrical spacer 63 is disposed.

This spacer 63 is formed of, for example, aluminum and an ignition agent 64 which includes an auto-ignition powder igniting at a low temperature of, for example, 180C.° is disposed at its center.

The ignition agent 64 is accommodated in an ignition agent pack 65.

On the other hand, the cap 61 disposed on the other end of the cylindrical pack 53 is tightly wound around its outer periphery by the cylindrical pack 53 to form a cylindrical fasten-folded section 67.

And, at the center of the cap 61 is formed a projection 68 to accommodate an ignition agent 66.

The ignition agent 66 contains powder for auto-ignition which ignites at a low temperature of 180C.° and is accommodated in an ignition agent pack 69.

A space 71 is formed on the side of the cap 61 in the cylindrical pack 53. In the space 71, a holder 73 which is in contact with one of the gas generating agents 57 and another holder 75 which is in contact with the cap 61 are accommodated. Both ends of a coil spring 77 are supported by the holders 73, 75.

As shown in FIG. 1, the first end plate 37 which seals one end of the outer cylindrical member 35 is made of an end cap and caulked for fixing against the cylindrical pack 53 by an open end 79 of the outer cylindrical member 35.

The above fixing by caulking is made by a step that with a fitting section 81 of the first end plate 37 mated with the open end of the inner cylindrical member 47, the open end 79 of the outer cylindrical member 35 is bent toward the first end plate 37 by a press under a certain pressure to effect plastic deformation.

A through hole 83 is formed at the center of the first end plate 37, and an igniter 85 is inserted into the through hole 83 and is fixed to the first end plate 37 by caulking.

A packing 87 made of, for example, inflammable silicone rubber, is disposed between one end of the final filter 45 and the first end plate 37 and between the other end of the final filter 45 and the second end plate 39.

Figure 4:
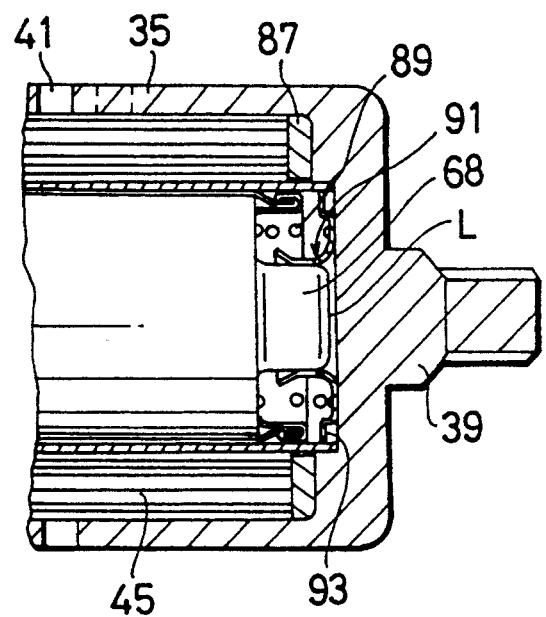
FIG. 4 is an enlarged view showing the second end plate of FIG. 1 and its neighbor in detail.

In this embodiment, an energizing member 89 made of, for example, a coil spring is disposed between the cap 61 forming the second end face 62 of the gas generating agent pack 51 and the second end plate 39 of the outer cylindrical member 35 as shown in FIG. 4.

And, the leading end of the projection 68 is disposed with a certain gap L provided against the second end plate 39.

With this projection 68, a heat transmission member 91 which is pressed by the energizing member 89 against the second end plate 39 is mated by a fitting load smaller than the energizing load of the energizing member 89.

Figure 5:
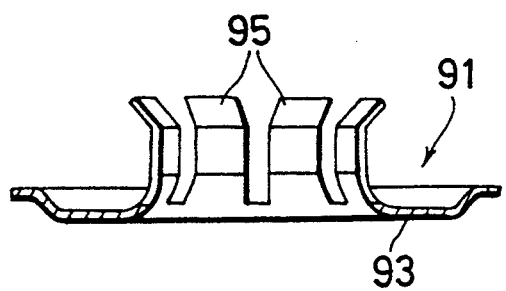
FIG. 5 is a sectional view showing the heat transmission member of FIG. 1.
Figure 6:
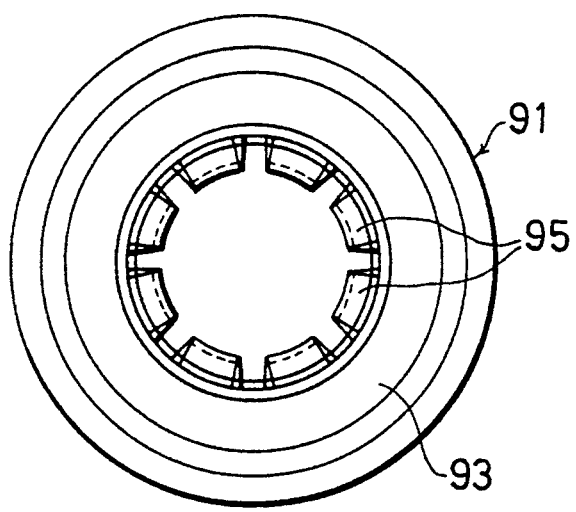
FIG. 6 is a top view of FIG. 5.

FIG. 5 and FIG. 6 show the details of the heat transmission member 91, which is made of metal with good heat conduction such as aluminum or copper. And, a plurality of fitting pieces 95 which are fitted to the projection 68 are erected and integrally formed on the inner periphery of a collar 93.

In this embodiment, a fitting load of the heat transmission member 91 to the projection 68 is 0.2 to 1.2 kg and an energizing force of the energizing member 89 is 3.8 kg.

And, the other end of the energizing member 89 is contacted to the inside of the collar 93 of the heat transmission member 91 and the collar 93 is pressed against the second end plate 39 under a certain pressing pressure.

In the aforementioned air bag inflation gas generator, the ignition agent 64 burns when electricity is sent to the igniter 85, which in turn burns the gas generating agents 57, the cylindrical pack 53 of the gas generating agent pack 51 is broken at the gas flow openings 49 of the inner cylindrical member 47, combustion gas flows into the final filter 45 through the gas flow openings 49 of the inner cylindrical member 47 and is purified by the final filter 45, then it is flown into the air bag through the gas outlets 41 of the outer cylindrical member 35.

And, in the above embodiment, when electricity is sent to the igniter 85 which is disposed at one end of the outer cylindrical member 35, the ignition agent 64 disposed at one end burns first and the gas generating agent 57 adjacent to the igniter 85 starts burning and, at the same time, the ignition agent 66 disposed at the other end burns, and the gas generating agent 57 next to it burns.

In the air bag inflation gas generator configured as described above, when the generator is exposed to a high temperature environment such as fire and a temperature of the second end plate 39 rises, heat of the second end plate 39 is transmitted to the ignition agent 66 accommodated in the projection 68 via the heat transmission member 91 which is fitted to the projection 68 of the cylindrical pack 53, the ignition agent 66 is ignited at a temperature of for example, 180C.° thoroughly lower than the firing temperature, for example, 390C° of the gas generating agents 57, then the gas generating agents 57 are burnt, so that the possibility of inducing the explosion of the vessel under a high temperature environment can be remarkably lowered.

And, since the energizing member 89 presses the first end face 59 of the cylindrical pack 53 toward the first end plate 37 in which the igniter 85 is accommodated, a space between the igniting agent 64 and the igniter 85 disposed at one end of the cylindrical pack 53 can be surely retained, and reliability of igniting the igniting agent 64 by the igniter 85 can be improved.

Further, in the above air bag inflation gas generator, the heat transmission member 91 is fitted to the projection 68 under a fitting load smaller than the energizing force of the energizing member 89 and therefore, even if the cylindrical pack 53 is shifted toward the second end plate 39 when the first end plate 37 is caulked by the open end 79 of the outer cylindrical member 35 toward the cylindrical pack 53, the caulking process can be surely conducted since the first end face 59 of the cylindrical pack 53 is pressed by the energizing member 89 to move toward the first end plate 37 in which the igniter 85 is accommodated at the termination of the caulking process.

And, in the aforementioned air bag inflation gas generator, when the first end plate 37 is caulked by the open end 79 of the outer cylindrical member 35 toward the cylindrical pack 53, the cylindrical pack 53 is shifted toward the second end plate 39 but, since the projection 68 is formed with a certain gap disposed with respect to the second end plate 39 and is inserted in the heat transmission member 91 under a fitting load smaller than the energizing force of the energizing member 89, the projection 68 is relatively easily moved forward, so that the application of heavy load to the projection 68 can be prevented.

And in this embodiment, the application of heavy load to the projection 68 is prevented, so that a fasten-folded section 67 of the cap 61 to the cylindrical pack 53 can be surely prevented from being opened.

Besides, in this embodiment, the ignition agent 64 which contains auto-ignition powder which ignites at a low temperature, for example 180 C.° , is disposed within the spacer 63 made of aluminum which is good in heat conduction and therefore, if a car catches fire, heat from the first end plate 37 on the side of the igniter 85 is efficiently conducted to the spacer 63 and the auto-ignition powder is ignited, so that the possibility that the air bag inflation gas generator is broken in case of a car fire can be surely prevented.

Figure 7:
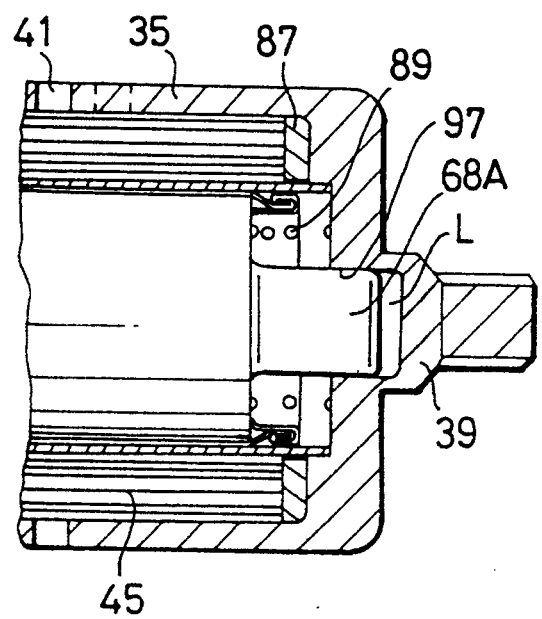
FIG. 7 is a sectional view showing another example of an air bag inflation gas generator according to the second embodiment of the invention.

FIG. 7 shows in detail the essential part of an example of the air bag inflation gas generator according to the second embodiment of the invention, wherein a projection 68A is inserted in a concave part 97 formed in the second end plate 39 with a certain gap L disposed with respect to the bottom of the concave part 97.

And, a fitting load of the projection 68A to the concave part 97 is smaller than the energizing force of the energizing member 89.

In the air bag inflation gas generator of the above embodiment, when the generator is exposed to a high temperature environment such as fire and a temperature of the second end plate 37 rises, heat of the second end plate 39 is transmitted to the ignition agent 66 accommodated in the projection 68A directly from the concave part 97, the ignition agent 66 is ignited at a temperature thoroughly lower than the firing temperature of the gas generating agents 57, then the gas generating agents 57 are burnt, so that the possibility of inducing the explosion of the vessel at a high temperature environment can be remarkably lowered.

And, since the energizing member 89 presses the first end face 59 of the cylindrical pack 53 toward the first end plate 37 in which the igniter 85 is accommodated, a space between the igniting agent 64 and the igniter 85 disposed at one end of the cylindrical pack 53 can be surely retained.

Furthermore, since the projection 68A is fitted to the concave part 97 formed in the second end plate 39 under a fitting load smaller than the energizing force of the energizing member 89, even if the cylindrical pack 53 is shifted toward the second end plate 39 when the first end plate 37 is caulked by the open end 79 of the outer cylindrical member 35 toward the cylindrical pack 53, the caulking process can be surely conducted because the first end face 59 of the cylindrical pack 53 is pressed to move toward the first end plate 37 in which the igniter 85 is accommodated by the energizing member 89 at the termination of the caulking process.

In the aforementioned embodiment, the energizing member 89 is formed of a coil spring. But this invention is not limited to the above embodiment. It can be also formed of a cushion material such as resin.

Figure 8:
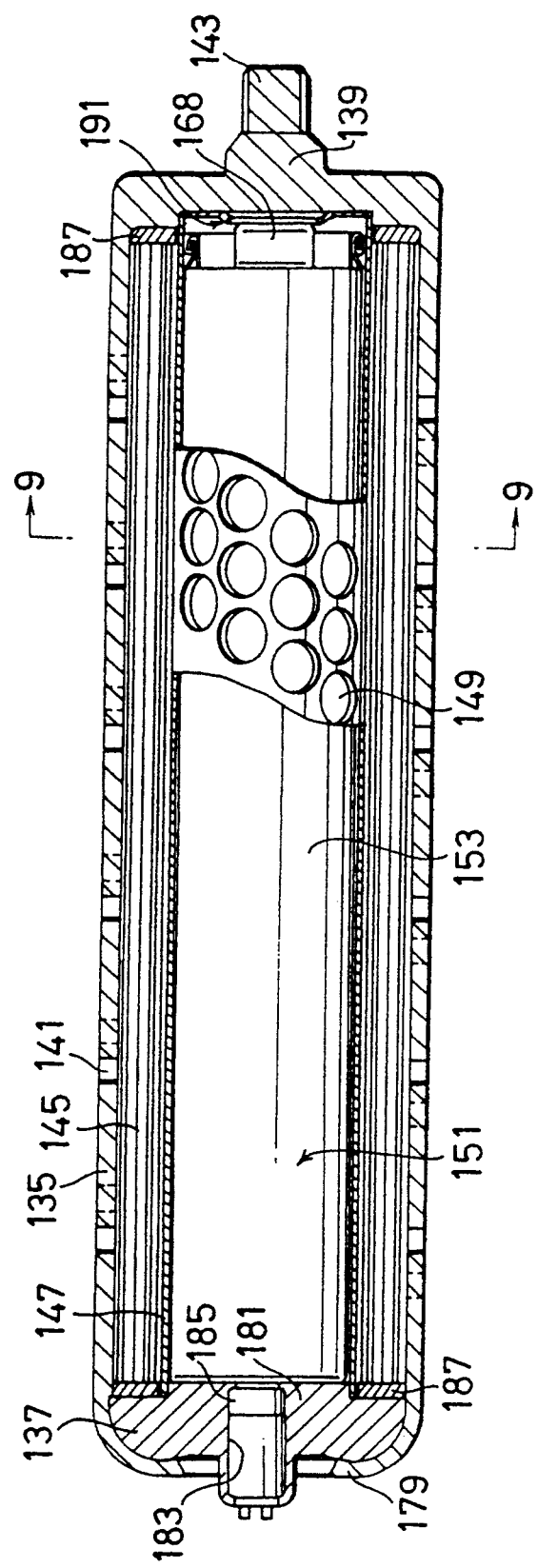
FIG. 8 is a longitudinal sectional view showing one example of an air bag inflation gas generator according to the third embodiment of this invention.
Figure 9:
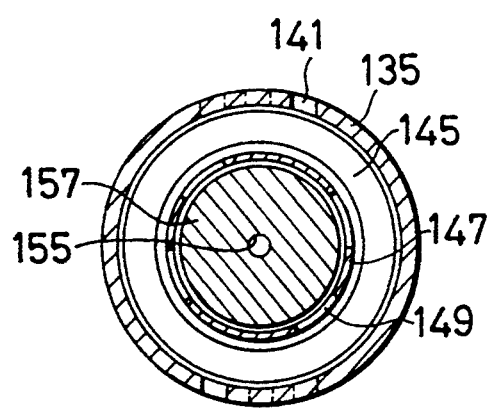
FIG. 9 is a transverse sectional view taken along the line 9—9 of FIG. 8.

FIG. 8 and FIG. 9 show one example of the air bag inflation gas generator according to the third embodiment of the invention. In the drawings, the reference numeral 135 represents a longitudinal outer cylindrical member whose both ends are tightly closed by a first end plate 137 and a second end plate 139.

The outer cylindrical member 135 has a plurality of gas flow openings 141 formed in its outer periphery.

And, the second end plate 139 is integrally formed with a part 143 to be mounted on a vehicle.

The outer cylindrical member 135 has a cylindrical final filter 145 disposed therein.

This final filter 145 is formed by winding, for example, fine-mesh woven metal wire, close-woven metal wire, etc. in layers. This filter has the functions that the combustion gas is cooled so that the air bag is not damaged, the combustion residue contained in the combustion gas is removed, and harmless nitrogen gas only is supplied into the air bag.

Inside the final filter 145 is inserted an inner cylindrical member 147.

The inner cylindrical member 147 has many gas flow openings 149 formed in the entire length of the outer periphery thereof.

The inner cylindrical member 147 accommodates a gas generating agent pack 151.

Figure 10:
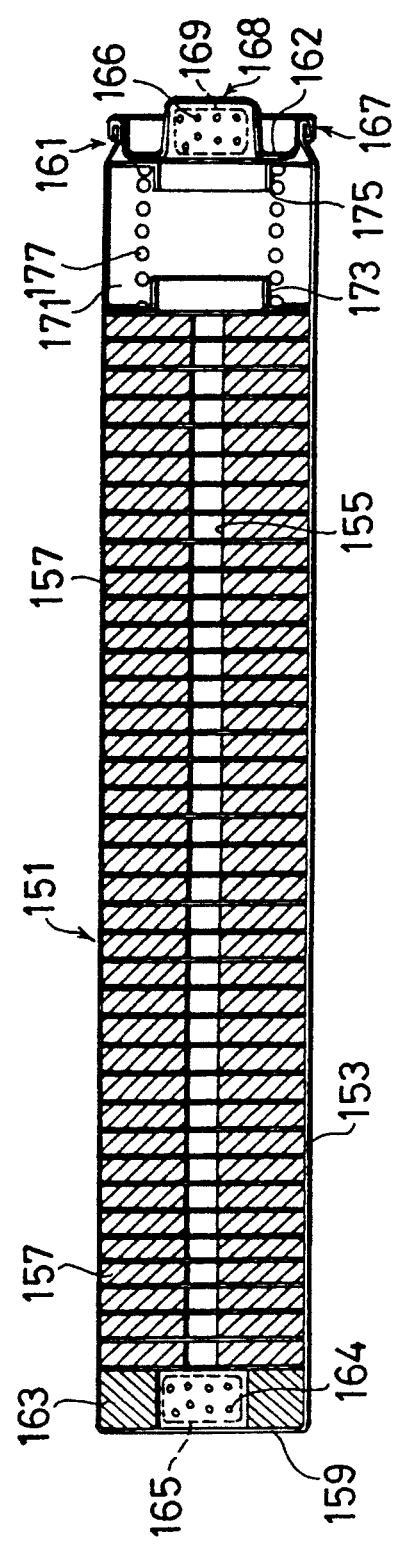
FIG. 10 is a sectional view showing the gas generating agent pack of FIG. 8.
Figure 11:
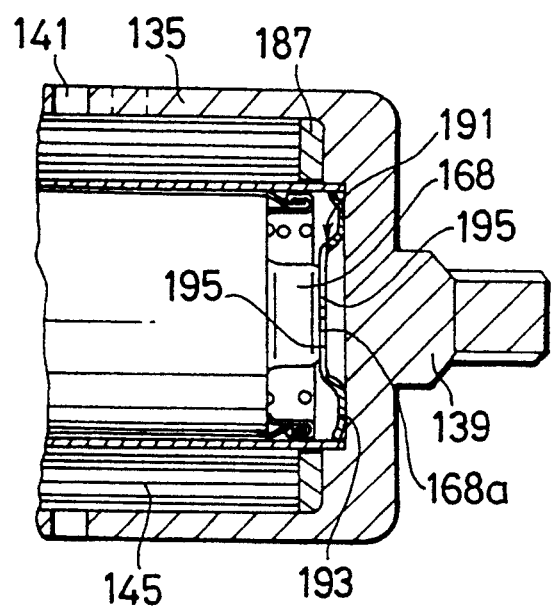
FIG. 11 is an enlarged view showing the second end plate of FIG. 8 and its neighbor in detail.

The gas generating agent pack 151 has a bottom-closed longitudinal cylindrical pack 153 which is made of aluminum as shown in FIG. 10.

Within the cylindrical pack 153, many gas generating agents 157 having a through hole 155 formed in their center are accommodated in the stacked state in the axial direction.

One end of the cylindrical pack 153 is sealed by a first end face 159, and the other end is sealed by a second end face 162 made of, for example, an aluminum cap 161.

At one end of the cylindrical pack 153, a cylindrical spacer 163 is disposed.

This spacer 163 is formed of, for example, aluminum and an ignition agent 164 which includes an auto-ignition powder igniting at a low temperature of, for example, 180 C.° is disposed at its center.

The ignition agent 164 is accommodated in an ignition agent pack 165.

On the other hand, the cap 161 disposed on the other end of the cylindrical pack 153 is tightly wound around its outer periphery by the cylindrical pack 153 to form a cylindrical fasten-folded section 167.

And, at the center of the cap 161 is formed a projection 168 to accommodate an ignition agent 166.

The ignition agent 166 contains powder for auto-ignition which ignites at a low temperature of 180 C.° and is accommodated in an ignition agent pack 169.

A space 171 is formed on the side of the cap 161 in the cylindrical pack 153. In the space 171, a holder 173 which is in contact with one of the gas generating agents 157 and another holder 175 which is in contact with the cap 161 are accommodated. Both ends of a coil spring 177 are supported by the holders 173, 175.

As shown in FIG. 8, the first end plate 137 which seals one end of the outer cylindrical member 135 is made of an end cap and caulked for fixing against the cylindrical pack 153 by an open end 179 of the outer cylindrical member 135.

The above fixing by caulking is made by a step that with a fitting section 181 of the first end plate 137 mated with the open end of the inner cylindrical member 147, the open end 179 of the outer cylindrical member 135 is bent toward the first end plate 137 by a press under a certain pressure to effect plastic deformation.

A through hole 183 is formed at the center of the first end plate 137, and an igniter 185 is inserted into the through hole 183 and is fixed to the first end plate 137 by caulking.

A packing 187 made of, for example, inflammable silicone rubber, is disposed between one end of the final filter 145 and the first end plate 137 and between the other end of the final filter 145 and the second end plate 139.

In the above embodiment, a heat transmission member 191 made of metal with good heat conductivity and having a function to energize the cylindrical pack 153 toward the first end plate 137 is disposed between the leading end face 168a of the projection 168 of the cylindrical pack 153 and the second end plate 139.

Figure 12:
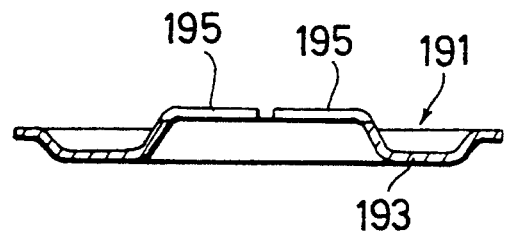
FIG. 12 is a sectional view showing the heat transmission member of FIG. 8.
Figure 13:
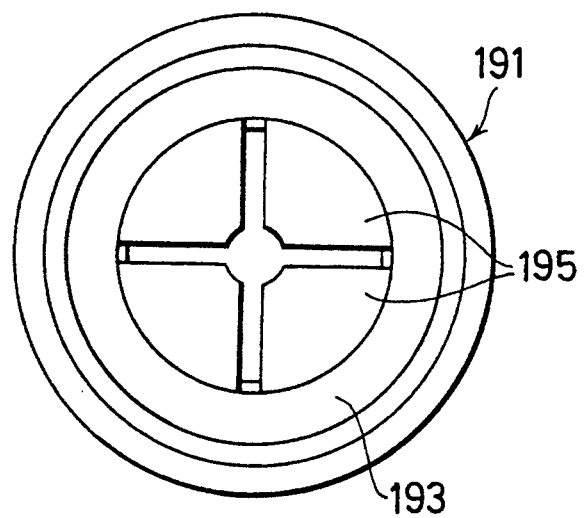
FIG. 13 is a top view of FIG. 12.

FIG. 12 and FIG. 13 show the details of the heat transmission member 191, which is made of metal with good heat conduction such as copper, iron or stainless steel. And, a plurality of leaf springs 195 are integrally formed on the inner periphery of a collar 193.

In the aforementioned air bag inflation gas generator, the ignition agent 164 burns when electricity is sent to the igniter 185, which in turn burns the gas generating agents 157, the cylindrical pack 153 of the gas generating agent pack 151 is broken at the gas flow openings 149 of the inner cylindrical member 147, combustion gas flows into the final filter 145 through the gas flow openings 149 of the inner cylindrical member 147 and is purified by the final filter 145, then it is flown into the air bag through the gas outlets 141 of the outer cylindrical member 135.

And, in this embodiment, when electricity is sent to the igniter 185 which is disposed at one end of the outer cylindrical member 135, the ignition agent 164 disposed at one end burns first and the gas generating agent 157 adjacent to the igniter 185 starts burning and, at the same time, the ignition agent 166 disposed at the other end burns, and the gas generating agent 157 next to it burns.

In the air bag inflation gas generator configured as described above, when the generator is exposed to a high temperature environment such as fire and a temperature of the second end plate 139 rises, heat of the second end plate 139 is transmitted to the ignition agent 166 accommodated in the projection 168 via the heat transmission member 191 which is disposed between the leading end face 168a of the projection 168 of the cylindrical pack 153 and the second end plate 139, the ignition agent 166 is ignited at a temperature, for example, 180 C.° thoroughly lower than the firing temperature, for example, 390 C.° of the gas generating agents 157, then the gas generating agents 157 are burnt, so that the possibility of inducing the explosion of the vessel under a high temperature environment can be remarkably lowered.

And, since the leaf spring 195 of the heat transmission member 191 presses the first end face 159 of the cylindrical pack 153 toward the first end plate 137 in which the igniter 185 is accommodated, a space between the igniting agent 164 and the igniter 185 disposed at one end of the cylindrical pack 153 can be surely retained, and reliability of igniting the igniting agent 164 by the igniter 185 can be improved.

Furthermore, in the aforementioned air bag inflation gas generator, when the first end plate 137 is caulked by the open end 179 of the outer cylindrical member 135 toward the cylindrical pack 153, the cylindrical pack 153 is shifted toward the second end plate 139 but, since the leaf spring 195 of the heat transmission member 191 is formed toward the second end plate 139, the application of heavy load to the projection 168 can be prevented.

And, in this embodiment, the application of heavy load to the projection 168 is surely prevented, so that the fasten-folded section 167 of the cap 161 to the cylindrical pack 153 can be surely prevented from being opened.

In the aforementioned embodiment, the leaf spring 195 is formed on the heat transmission member 191 as the energizing means. But this invention is not limited to the above embodiment. The heat transmission member can be also formed of a disc spring, for example.

Figure 14:
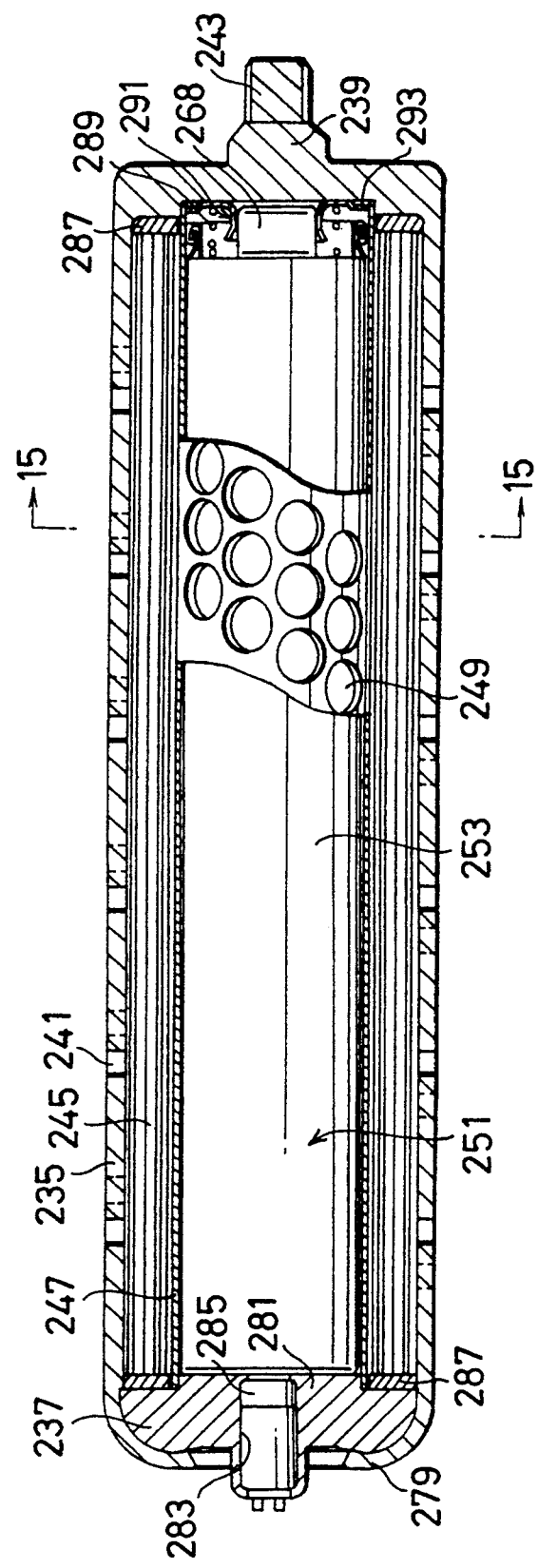
FIG. 14 is a longitudinal sectional view showing one example of an air bag inflation gas generator according to the fourth embodiment of this invention.
Figure 15:
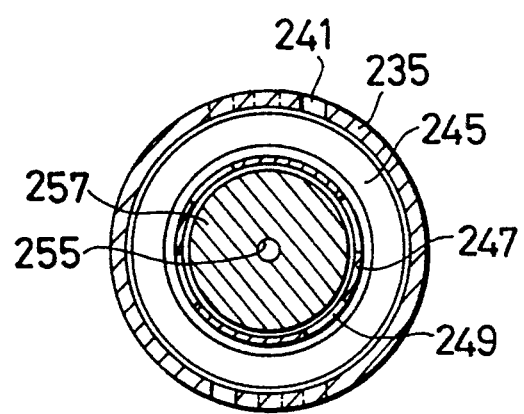
FIG. 15 is a transverse sectional view taken along the line 15—15 of FIG. 14.

FIG. 14 and FIG. 15 show one example of the air bag inflation gas generator according to the fourth embodiment of this invention. In the drawings, the reference numeral 235 represents a longitudinal outer cylindrical member whose both ends are tightly closed by a first end plate 237 and a second end plate 239.

The outer cylindrical member 235 has a plurality of gas flow openings 241 formed in its outer periphery.

And, the second end plate 239 is integrally formed with a part 243 to be mounted on a vehicle.

The outer cylindrical member 235 has a cylindrical final filter 245 disposed therein.

This final filter 245 is formed by winding, for example, fine-mesh woven metal wire, close-woven metal wire, etc. in layers. This filter has the functions that the combustion gas is cooled so that the air bag is not damaged, the combustion residue contained in the combustion gas is removed, and harmless nitrogen gas only is supplied into the air bag.

Inside the final filter 245 is inserted an inner cylindrical member 247.

The inner cylindrical member 247 has many gas flow openings 249 formed in the entire length of the outer periphery thereof.

The inner cylindrical member 247 accommodates a gas generating agent pack 251.

Figure 16:
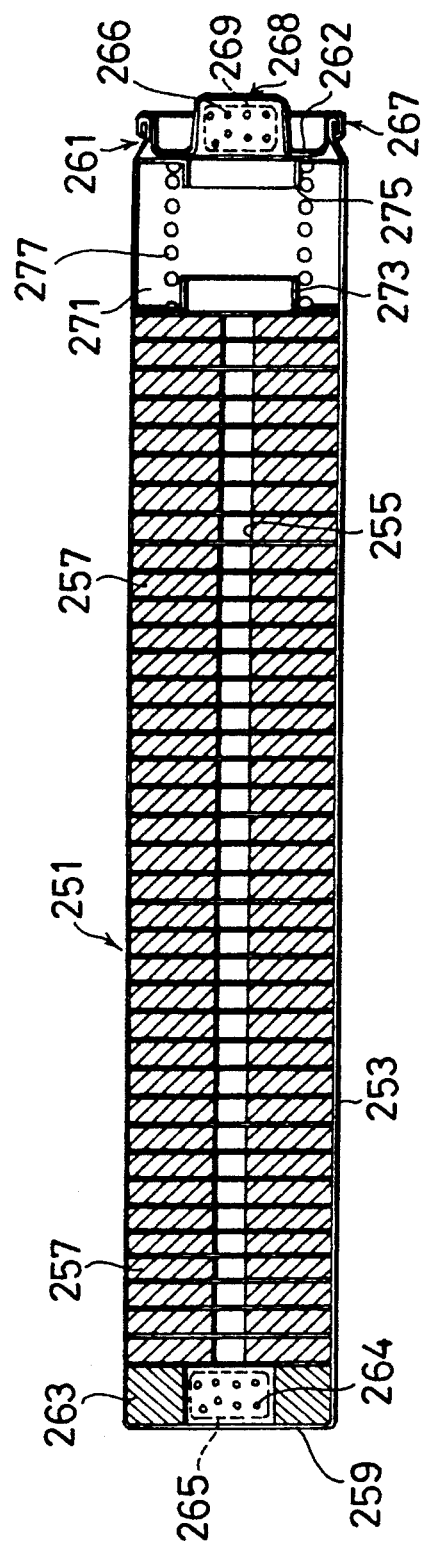
FIG. 16 is a sectional view showing the gas generating agent pack of FIG. 14.

The gas generating agent pack 251 has a bottom-closed longitudinal cylindrical pack 253 which is made of aluminum as shown in FIG. 16.

Within the cylindrical pack 253, many gas generating agents 257 having a through hole 255 formed in their center are accommodated in the stacked state in the axial direction.

One end of the cylindrical pack 253 is sealed by a first end face 259, and the other end is sealed by a second end face 262 made of, for example, an aluminum cap 261.

At one end of the cylindrical pack 253, a cylindrical spacer 263 is disposed.

This spacer 263 is formed of, for example, aluminum and an ignition agent 264 which includes an auto-ignition powder igniting at a low temperature of, for example, 180 C.° is disposed at its center.

The ignition agent 264 is accommodated in an ignition agent pack 265.

On the other hand, the cap 261 disposed on the other end of the cylindrical pack 253 is tightly wound around its outer periphery by the cylindrical pack 253 to form a cylindrical fasten-folded section 267.

And, at the center of the cap 261 is formed a projection 268 to accommodate an ignition agent 266.

The ignition agent 266 contains powder for auto-ignition which ignites at a low temperature of 180 C.° and is accommodated in an ignition agent pack 269.

A space 271 is formed on the side of the cap 261 in the cylindrical pack 253. In the space 271, a holder 273 which is in contact with one of the gas generating agents 257 and another holder 275 which is in contact with the cap 261 are accommodated. Both ends of a coil spring 277 are supported by the holders 273, 275.

As shown in FIG. 14, the first end plate 237 which seals one end of the outer cylindrical member 235 is made of an end cap and caulked for fixing against the cylindrical pack 253 by an open end 279 of the outer cylindrical member 235.

The above fixing by caulking is made by a step that with a fitting section 281 of the first end plate 237 mated with the open end of the inner cylindrical member 247, the open end 279 of the outer cylindrical member 235 is bent toward the first end plate 237 by a press under a certain pressure to effect plastic deformation.

A through hole 283 is formed at the center of the first end plate 237, and an igniter 285 is inserted into the through hole 283 and is fixed to the first end plate 237 by caulking.

A packing 287 made of, for example, inflammable silicone rubber, is disposed between one end of the final filter 245 and the first end plate 237 and between the other end of the final filter 245 and the second end plate 239.

Figure 17:
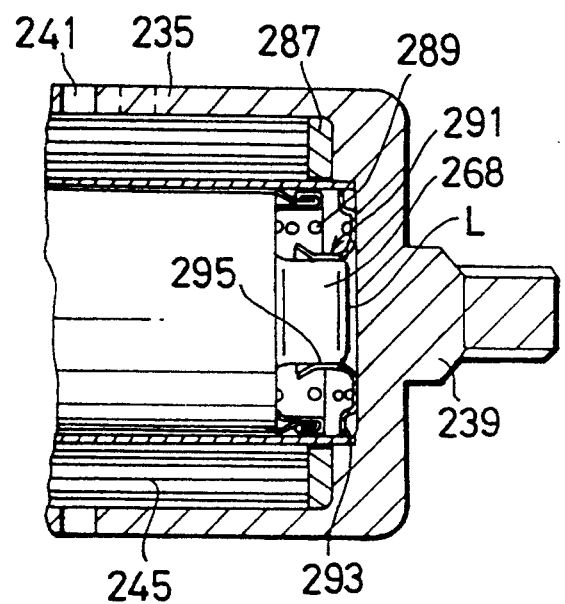
FIG. 17 is an enlarged view showing the second end plate of FIG. 14 and its neighbor in detail.

In this embodiment, an energizing member 289 made of, for example, a coil spring is disposed between the cap 261 forming the second end face 262 of the gas generating agent pack 251 and the second end plate 239 of the outer cylindrical member 235 as shown in FIG. 17.

And, the leading end of the projection 268 is disposed with a certain gap L provided against the second end plate 239.

On the projection 268, a temperature sensing member 291 is disposed, which is deformed at a certain temperature to contact to the projection 268 under a certain pressure and conducts heat from the second end plate 239 to the projection 268.

Figure 18:
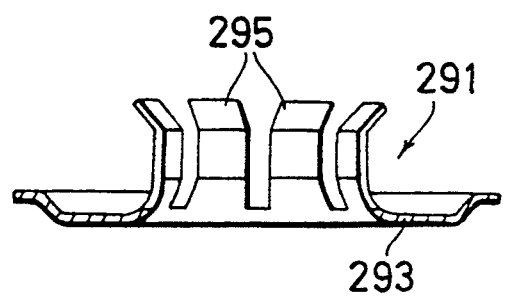
FIG. 18 is a sectional view showing the temperature sensing member of FIG. 14.
Figure 19:
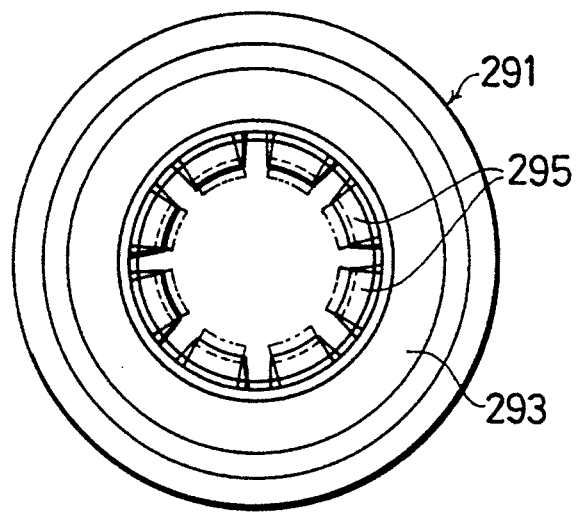
FIG. 19 is a top view of FIG. 18.

FIG. 18 and FIG. 19 show the details of the temperature sensing member 291, which is made of a shape memory alloy with good heat conduction. And, a plurality of heat conduction pieces 295 in which the projection 268 is inserted with a certain very small gap retained at normal temperature are erected and integrally formed on the inner periphery of a collar 293.

The plurality of heat conduction pieces 295, when their temperature is raised to about 100 C.°, for example, are thermally deformed toward inside as shown by a two-dot chain line in FIG. 19 and contacted to the projection 268 under a certain pressure.

In this embodiment, the collar 293 of the temperature sensing member 291 is always kept pressed toward the second end plate 239 by the energizing member 289 under a certain pressure.

In the air bag inflation gas generator described above, the ignition agent 264 burns when electricity is sent to the igniter 285, which in turn burns the gas generating agents 257, the cylindrical pack 253 of the gas generating agent pack 251 is broken at the gas flow openings 249 of the inner cylindrical member 247, combustion gas flows into the final filter 245 through the gas flow openings 249 of the inner cylindrical member 247 and is purified by the final filter 245, then it is flown into the air bag through the gas outlets 241 of the outer cylindrical member 235.

And, in the above embodiment, when electricity is sent to the igniter 285 which is disposed at one end of the outer cylindrical member 235, the ignition agent 264 disposed at one end burns first and the gas generating agent 257 adjacent to the igniter 285 starts burning and, at the same time, the ignition agent 266 disposed at the other end burns, and the gas generating agent 257 next to it burns.

In the air bag inflation gas generator configured as described above, when the generator is exposed to a high temperature environment such as fire and a temperature of the second end plate 239 rises, a temperature of the temperature sensing member 291 rises, the heat conduction pieces 295 of the temperature sensing member 291 are deformed to contact the heat conduction pieces 295 against the projection 268 under a certain pressure, heat of the second end plate 239 is transmitted to the ignition agent 266 accommodated in the projection 268 via the temperature sensing member 291, the ignition agent 266 is ignited at a temperature, for example, 180 C.° thoroughly lower than the firing temperature, for example, 390 C.° of the gas generating agents 257, then the gas generating agents 257 are burnt, so that the possibility of inducing the explosion of the vessel under a high temperature environment can be remarkably lowered.

And, since the energizing member 289 presses the first end face 259 of the cylindrical pack 253 toward the first end plate 237 in which the igniter 285 is accommodated, a space between the igniting agent 264 and the igniter 285 disposed at one end of the cylindrical pack 253 can be surely retained, and reliability of igniting the igniting agent 264 by the igniter 285 can be improved.

Furthermore, in the aforementioned air bag inflation gas generator, when the first end plate 237 is caulked by the open end 279 of the outer cylindrical member 235 toward the cylindrical pack 253, the cylindrical pack 253 is shifted toward the second end plate 239 but, since the heat conduction pieces 295 of the temperature sensing member 291 are not pressed against the projection 268, the projection 268 is relatively easily moved forward, and the application of a heavy load to the projection 268 can be prevented.

And, in this embodiment, the application of a heavy load to the projection 268 is surely prevented, so that the fasten-folded section 267 of the cap 261 to the cylindrical pack 253 can be surely prevented from being opened.

Figure 20:
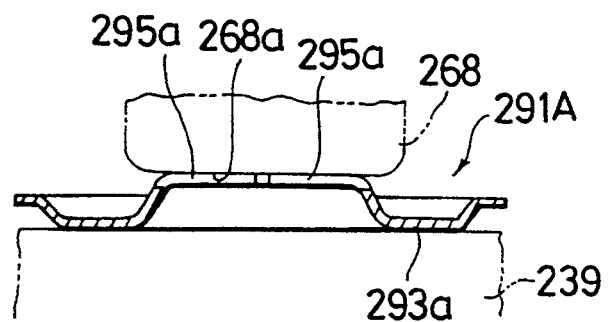
FIG. 20 is a sectional view showing the temperature sensing member of another example of an air bag inflation gas generator according to the fourth embodiment of this invention.
Figure 21:
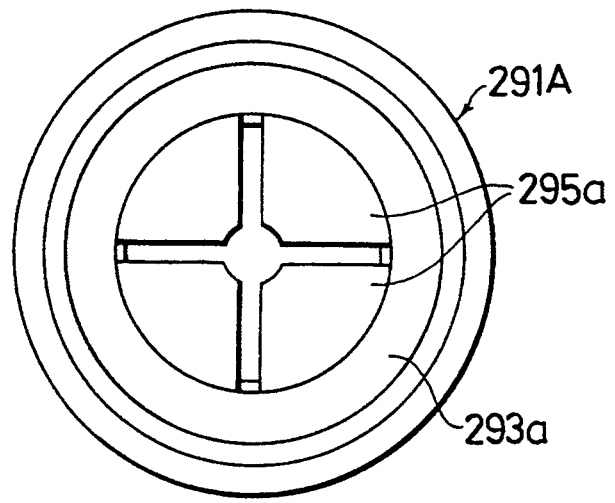
FIG. 21 is a top view of FIG. 18.

FIG. 20 and FIG. 21 show another example of the fourth embodiment of the invention. In this example, a temperature sensing member 291A made of metal with good heat conduction is disposed between a leading end face 268a of the projection 268 of the cylindrical pack 253 and the second end plate 239.

This temperature sensing member 291A has a plurality of heat conduction pieces 295a integrally formed on the inner periphery of a collar 293a. When the temperature sensing member 291A is exposed to a high temperature environment such as fire and a temperature of the second end plate 239 rises, a temperature of the temperature sensing member 291A rises, the heat conduction pieces 295a of the temperature sensing member 291A are deformed toward the projection 268, the heat conduction pieces 295a are contacted to the leading end face 268a of the projection 268 under a certain pressure, heat of the second end plate 239 is transmitted to the ignition agent 266 accommodated in the projection 268 via the temperature sensing member 291A.

In this example, substantially the same effect as in the aforementioned example can be obtained.

In the aforementioned embodiment, the temperature sensing member 291 is formed of a shape memory alloy. But this invention is not limited to the above embodiment. The temperature sensing member 291 can also be formed of a bimetal, for example.

In the aforementioned embodiment, the energizing member 289 is formed of a coil spring. But this invention is not limited to the above embodiment. It can also be formed of a cushion material such as resin.

Figure 22:
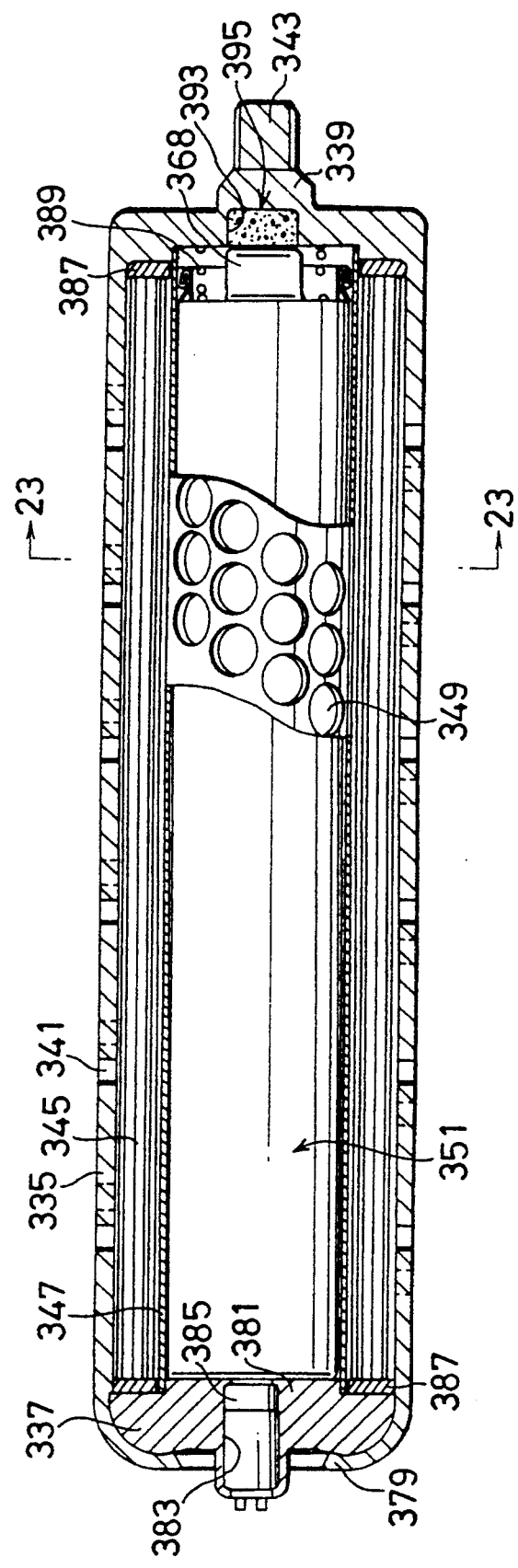
FIG. 22 is a longitudinal sectional view showing one example of an air bag inflation gas generator according to the fifth embodiment of this invention.
Figure 23:
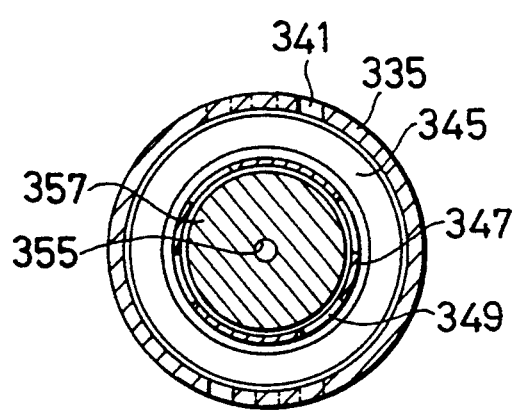
FIG. 23 is a transverse sectional view taken along the line 2—2 of FIG. 22.

FIG. 22 and FIG. 23 show one example of the air bag inflation gas generator according to the fifth embodiment of this invention. In the drawings, the reference numeral 335 represents a longitudinal outer cylindrical member whose both ends are tightly closed by a first end plate 337 and a second end plate 339.

The outer cylindrical member 335 has a plurality of gas flow openings 341 formed in its outer periphery.

And, the second end plate 339 is integrally formed with a part 343 to be mounted on a vehicle.

The outer cylindrical member 335 has a cylindrical final filter 345 disposed therein.

This final filter 345 is formed by winding, for example, fine-mesh woven metal wire, close-woven metal wire, etc. in layers. This filter has the functions that the combustion gas is cooled so that the air bag is not damaged, the combustion residue contained in the combustion gas is removed, and harmless nitrogen gas only is supplied into the air bag.

Inside the final filter 345 is inserted an inner cylindrical member 347.

The inner cylindrical member 347 has many gas flow openings 349 formed in the entire length of the outer periphery thereof.

The inner cylindrical member 347 accommodates a gas generating agent pack 351.

Figure 24:
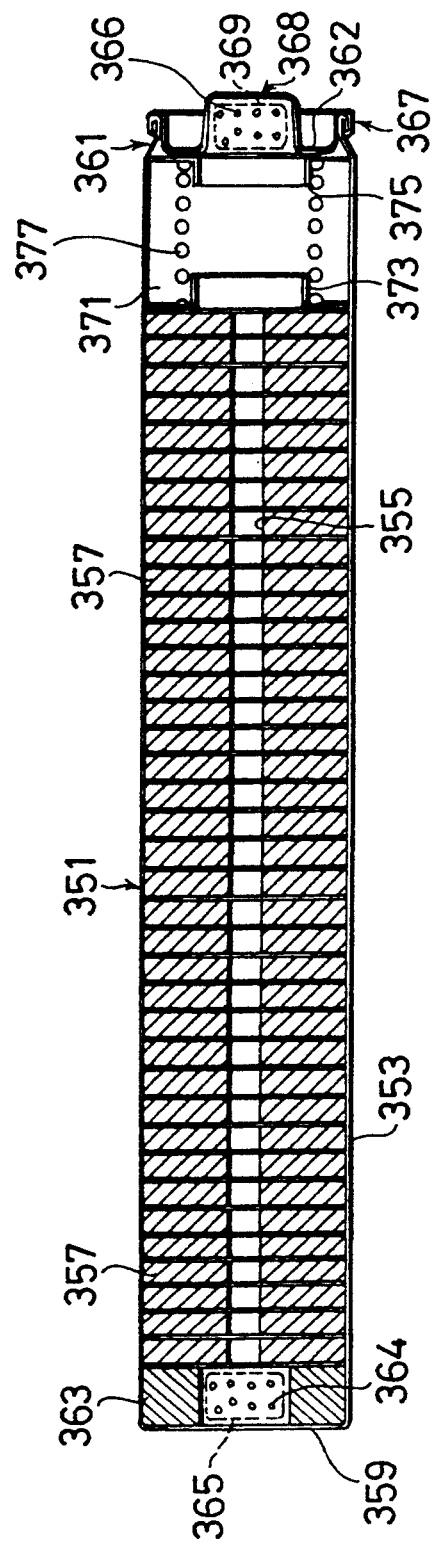
FIG. 24 is a sectional view showing the gas generating agent pack of FIG. 22.

The gas generating agent pack 351 has a bottom-closed longitudinal cylindrical pack 353 which is made of aluminum as shown in FIG. 24.

Within the cylindrical pack 353, many gas generating agents 357 having a through hole 355 formed in their center are accommodated in the stacked state in the axial direction.

One end of the cylindrical pack 353 is sealed by a first end face 359, and the other end is sealed by a second end face 362 made of, for example, an aluminum cap 361.

At one end of the cylindrical pack 353, a cylindrical spacer 363 is disposed.

This spacer 363 is formed of, for example, aluminum and an ignition agent 364 which includes auto-ignition powder igniting at a low temperature of, for example, 180C.° is disposed at its center.

The ignition agent 364 is accommodated in an ignition agent pack 365.

On the other hand, the cap 361 disposed on the other end of the cylindrical pack 353 is tightly wound around its outer periphery by the cylindrical pack 353 to form a cylindrical fasten-folded section 367.

And, at the center of the cap 361 is formed a projection 368 to accommodate an ignition agent 366.

The ignition agent 366 contains powder for auto-ignition which ignites at a low temperature of 180C.° and is accommodated in an ignition agent pack 369.

A space 371 is formed on the side of the cap 361 in the cylindrical pack 353. In the space 371, a holder 373 which is in contact with one of the gas generating agents 357 and another holder 375 which is in contact with the cap 361 are accommodated. Both ends of a coil spring 377 are supported by the holders 373, 375.

As shown in FIG. 22, the first end plate 337 which seals one end of the outer cylindrical member 335 is made of an end cap and caulked for fixing against the cylindrical pack 353 by an open end 379 of the outer cylindrical member 335.

The above fixing by caulking is made by a step that with a fitting section 381 of the first end plate 337 mated with the open end of the inner cylindrical member 347, the open end 379 of the outer cylindrical member 335 is bent toward the first end plate 337 by a press under a certain pressure to effect plastic deformation.

A through hole 383 is formed at the center of the first end plate 337, and an igniter 385 is inserted into the through hole 383 and is fixed to the first end plate 337 by caulking.

A packing 387 made of, for example, inflammable silicone rubber, is disposed between one end of the final filter 345 and the first end plate 337 and between the other end of the final filter 345 and the second end plate 339.

Figure 25:
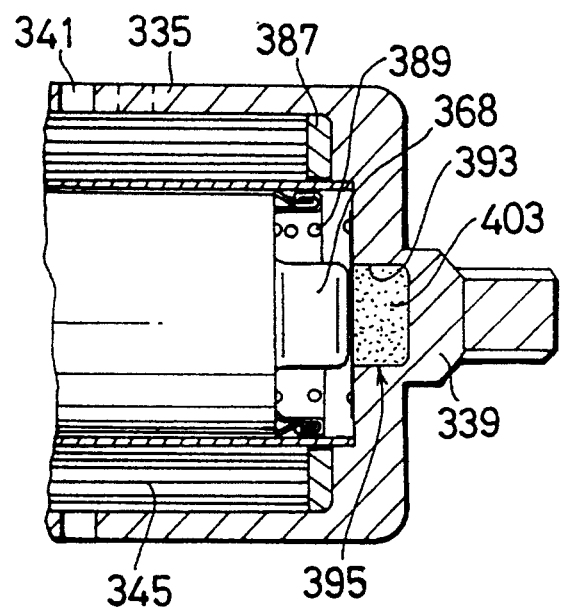
FIG. 25 is an enlarged view showing the second end plate of FIG. 22 and its neighbor in detail.

An energizing member 389 which is made of, for example, a coil spring is disposed between the cap 361 forming the second end face 362 of the gas generating agent pack 351 and the second end plate 339 of the outer cylindrical member 335 as shown in FIG. 25.

In this example, a concave part 393 is formed in the second end plate of the outer cylindrical member 335, and an auto-ignition 395 igniting at a firing temperature which is lower than the firing temperature of the gas generating agents 357 and higher than the maximum temperature which generally occurs is disposed in the concave part 393.

Figure 26:
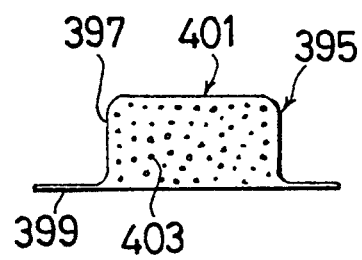
FIG. 26 is a sectional view showing the auto-ignition of FIG. 22.

FIG. 26 shows the details of the auto-ignition 395, which consists of a sealed container 401 in the shape of a capsule made of a cup 397 and a cap 399, and a detonator 403 accommodated in the sealed container 401.

And, in this example, the detonator 403 is prepared by mixing an ordinary ignition agent and an ignition temperature adjusting substance having an ignition temperature lower than that of the gas generating agents 357, for example, 390C.° and higher than the maximum temperature which may generally occur in a car interior, for example, 150C.°. For example, the detonator 403 has an ignition temperature of 180C.°.

This ignition temperature adjusting substance is formed of a simple substance of azide of alkaline earth metal consisting of calcium, strontium and barium.

And, the ignition temperature adjusting substance and magnesium are subjected to an agglomeration treatment with ethylene tetrafluoride and ethylene trifluoride as binders.

More specifically, the detonator 403 of this example is a flocculent detonator which consists of, for example, 50% by weight of barium azide, 28% by weight of magnesium, 18% by weight of ethylene tetrafluoride, and 4% by weight of ethylene trifluoride. For example, when 1.1 g of the detonator is used, its calorific value is 1940 calories/g and gas yield is 341 cc/g. When compared with a conventional detonator consisting of boron and potassium nitrate having a caloric value of 13790 calories/g and a gas yield of 379 cc/g, the caloric value is higher and the gas yield is lower.

This detonator 403 is produced by the following procedure, for example.

To produce 300 g of the detonator 403, 12 g of ethylene trifluoride is dissolved in toluene, 84 g of magnesium is added thereto so as to be thoroughly damped, the damped magnesium is mixed with 54g of ethylene tetrafluoride and 150g of barium azide, then the resultant mixture is passed through a 12-mesh sieve five times and dried, and the dried mixture is stirred with a mixer. Thus, the flocculent detonator 403 is obtained.

In the aforementioned air bag inflation gas generator, the ignition agent 364 burns when electricity is sent to the igniter 385, which in turn burns the gas generating agents 357, the cylindrical pack 353 of the gas generating agent pack 351 is broken at the gas flow openings 349 of the inner cylindrical member 347, the combustion gas flows into the final filter 345 through the gas flow openings 349 of the inner cylindrical member 347 and is purified by the final filter 345, then it is flown into the air bag through the gas outlets 341 of the outer cylindrical member 335.

And, in the above embodiment, when electricity is sent to the igniter 385 which is disposed at one end of the outer cylindrical member 335, the ignition agent 364 disposed at one end burns first and the gas generating agent 357 adjacent to the igniter 385 starts burning and, at the same time, the ignition agent 366 disposed at the other end burns, and the gas generating agent 357 next to it burns.

In the air bag inflation gas generator configured as described above, since the ignition agent 366 is disposed at the second end face 362 of the cylindrical pack 353 and the auto-ignition 395, which ignites at a firing temperature lower than the firing temperature of the gas generating agents 357 and higher than the maximum temperature which generally occurs, is disposed in the concave part 393 formed in the second end plate 339 of the outer cylindrical member 335, when the generator is exposed to a high temperature environment such as fire and a temperature of the second end plate 339 exceeds a temperature higher then the maximum temperature which may generally occur, the auto-ignition 395 ignites, the ignition agent 366 ignites at a temperature thoroughly lower than the ignition temperature of the gas generating agents 357, then the gas generating agents 357 burns, so that the possibility of inducing the explosion of the vessel which forms the combustion chamber, for example, the inner cylindrical member 347 and the outer cylindrical member 335, under a high temperature environment can be remarkably lowered as compared with prior art.

More specifically, in the aforementioned air bag inflation gas generator, if a car catches fire, the auto-ignition 395 is automatically ignited when a temperature of the second end plate 339 of the outer cylindrical member 335 becomes lower than the ignition temperature of the gas generating agents 357, for example, 390 C.° and higher than the maximum temperature which may generally occur in a car interior, for example, 180 C.°. At this time of ignition, the outer cylindrical member 335 and the inner cylindrical member 347 retain certain pressure proof resistance, so that the possibility of inducing the explosion of the vessel which forms the combustion chamber under a high temperature environment can be remarkably lowered as compared with prior art.

And, in the aforementioned air bag inflation gas generator, the auto-ignition 395 is disposed in the concave part 393 formed in the second end plate 339 of the outer cylindrical member 335. And, in case of fire, a temperature of outside environment is immediately conducted to the auto-ignition 395 via the outer cylindrical member 335. Therefore, operation of the auto-ignition 395 is accurate.

Further, in the aforementioned air bag inflation gas generator, since the auto-ignition 395 is disposed in the concave part 393 formed in the second end plate 339, the generator can be made small.

Figure 27:
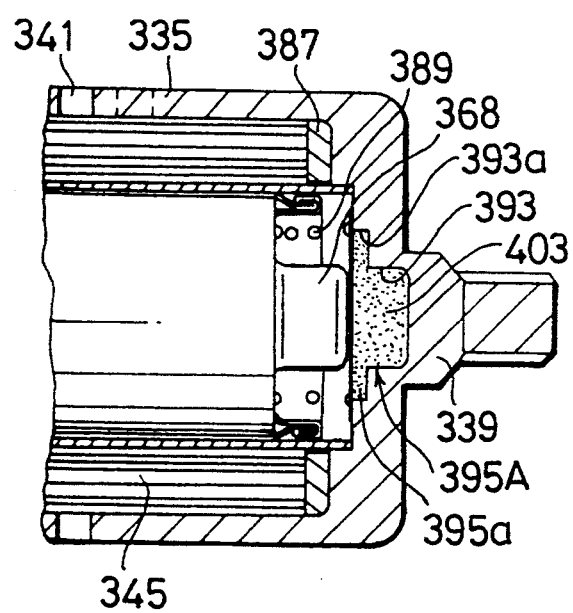
FIG. 27 is a sectional view showing another example of an air bag inflation gas generator according to the fifth embodiment of this invention.
Figure 28:
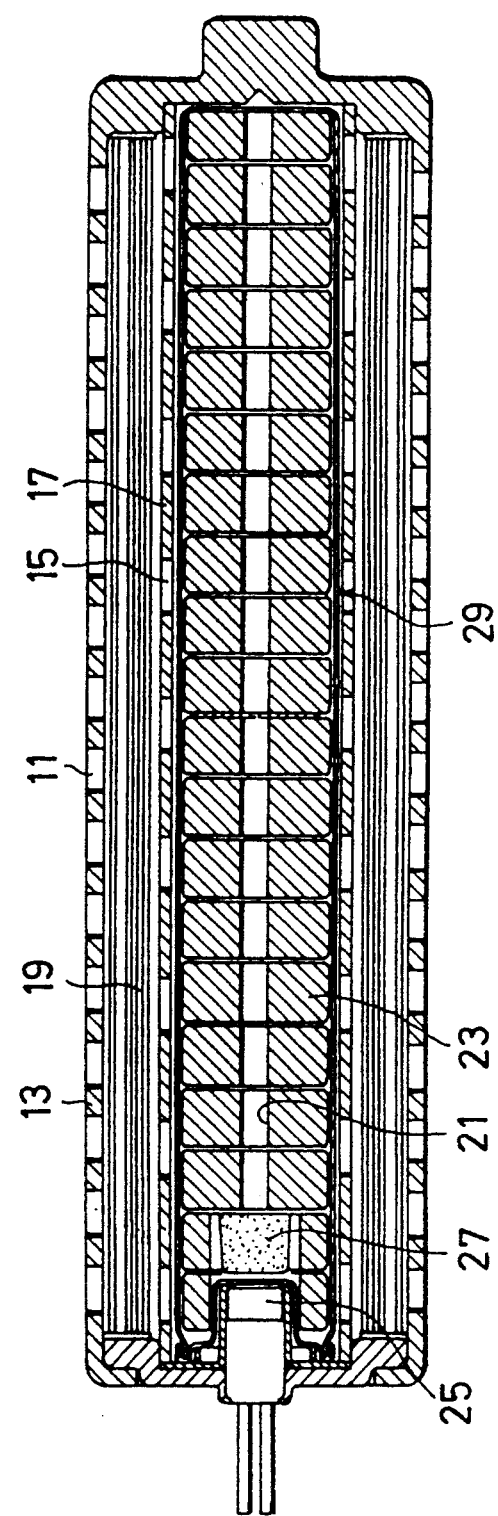
FIG. 28 is a longitudinal sectional view showing the air bag inflation gas generator previously filed by the applicant.

FIG. 27 shows another example of the fifth embodiment of the invention. In this example, a collar 395a is formed at one end of an auto-ignition 395A and accommodated in a concave part 393a formed in the second end plate 339.

In this example, substantially the same effect as in the aforementioned example can be obtained. But, since the collar 395a is formed, a temperature of outside environment can be conducted more quickly and surely, and the capacity of the auto-ignition 395A can be increased.

What is claimed is:

1. An air bag inflation gas generator comprising:
a longitudinal cylindrical member whose both ends are sealed by a first end plate and a second end plate and whose outer periphery has a plurality of gas outlets formed,
a gas generating agent pack which is accommodated in said cylindrical member, which has a plurality of gas generating agents accommodated in the stacked state in the axial direction within a longitudinal cylindrical pack with both ends sealed by a first end face and a second end face, and which has an ignition agent disposed near said first end face,
an igniter which is disposed at the first end plate of said cylindrical member, and
an energizing member which is disposed between the second end plate of said cylindrical member and the second end face of said cylindrical pack and energizes the cylindrical pack toward said igniter, wherein
said first end plate is caulked for fixing by an open end of said cylindrical member toward said cylindrical pack, a projection accommodating the ignition agent is formed on the second end face of said cylindrical pack with a certain gap disposed with respect to said second end plate, and a heat transmission member which is pressed against said second end plate by said energizing member is fitted to the projection under a fitting load smaller than the energizing force of said energizing member.

2. An air bag inflation gas generator comprising:
a longitudinal cylindrical member whose both ends are sealed by a first end plate and a second end plate and whose outer periphery has a plurality of gas outlets formed,
a gas generating agent pack which is accommodated in said cylindrical member, which has a plurality of gas generating agents accommodated in the stacked state in the axial direction within a longitudinal cylindrical pack with both ends sealed by a first end face and a second end face, and which has an ignition agent disposed near said first end face,
an igniter which is disposed at the first end plate of said cylindrical member, and
an energizing member which is disposed between the second end plate of said cylindrical member and the second end face of said cylindrical pack and energizes the cylindrical pack toward said igniter, wherein
the first end plate is caulked for fixing by an open end of said cylindrical member toward said cylindrical pack, a projection accommodating the ignition agent is formed on the second end face of said cylindrical pack, and the projection is inserted into a concave part which is formed in said second end plate under a fitting load smaller than the energizing force of the energizing member with a certain gap disposed with respect to the bottom of the concave part.

3. An air bag inflation gas generator comprising:
a longitudinal cylindrical member whose both ends are sealed by a first end plate and a second end plate and whose outer periphery has a plurality of gas outlets formed,
a gas generating agent pack which is accommodated in said cylindrical member, which has a plurality of gas generating agents accommodated in the stacked state in the axial direction within a longitudinal cylindrical pack with both ends sealed by a first end face and a second end face, and which has an ignition agent disposed near said first end face, and an igniter which is disposed at the first end plate of said cylindrical member, wherein said first end plate is caulked for fixing toward said cylindrical pack by the open end of said cylindrical member, a projection accommodating an ignition agent is formed on the second end face of said cylindrical pack, and between the leading end face of the projection and said second end plate, a heat transmission member made of metal with good heat conductivity and having a function to energize said cylindrical pack toward said first end plate is disposed.

4. An air bag inflation gas generator comprising:

a longitudinal cylindrical member whose both ends are sealed by a first end plate and a second end plate and whose outer periphery has a plurality of gas outlets formed, a gas generating agent pack which is accommodated in said cylindrical member, which has a plurality of gas generating agents accommodated in the stacked state in the axial direction within a longitudinal cylindrical pack with both ends sealed by a first end face and a second end face, and which has an ignition agent disposed near said first end face, an igniter which is disposed at the first end plate of said cylindrical member, and an energizing member which is disposed between the second end plate of said cylindrical member and the second end face of said cylindrical pack and energizes the cylindrical pack toward said igniter, wherein said first end plate is caulked for fixing by an open end of said cylindrical member toward said cylindrical pack, a projection accommodating the ignition agent is formed on the second end face of said cylindrical pack with a certain gap disposed with respect to said second end plate, and a temperature sensing member is disposed within said second end plate to contact under a certain pressure to said projection and the second end plate by deforming at a certain temperature and to transmit heat from said second end plate to the projection.

5. An air bag inflation gas generator comprising:

a longitudinal cylindrical member whose both ends are sealed by a first end plate and a second end plate and whose outer periphery has a plurality of gas outlets formed, a gas generating agent pack which is accommodated in said cylindrical member, which has a plurality of gas generating agents accommodated in the stacked state in the axial direction within a longitudinal cylindrical pack with both ends sealed by a first end face and a second end face, and which has an ignition agent disposed near said first end face, and an igniter which is disposed at the first end plate of said cylindrical member, wherein the ignition agent is disposed on the second end face of said cylindrical pack, and an auto-ignition igniting at a firing temperature which is lower than the firing temperature of the gas generating agents and higher than the maximum temperature which generally occurs is disposed in a concave part formed in the second end plate of said cylindrical member.

* * * * *